US012669359B2

(12) United States Patent
Hallett

(10) Patent No.: US 12,669,359 B2
(45) Date of Patent: Jun. 30, 2026

(54) FLOW MEASURING AND METERING APPARATUS FOR FLOWABLE GRANULAR SOLIDS

(71) Applicant: HALLETT'S HAY AND SEED LTD., Carstairs (CA)

(72) Inventor: Richard Hallett, Carstairs (CA)

(73) Assignee: Hallett's Hay and Seed Ltd., Carstairs (CA)

( * ) Notice: Subject to any disclaimer, the term of this patent is extended or adjusted under 35 U.S.C. 154(b) by 347 days.

(21) Appl. No.: 18/613,591

(22) Filed: Mar. 22, 2024

(65) Prior Publication Data

US 2024/0344867 A1     Oct. 17, 2024

Related U.S. Application Data

(63) Continuation-in-part of application No. 18/299,740, filed on Apr. 13, 2023, now Pat. No. 11,953,360.

(51) Int. Cl.
| | |
|---|---|
| *G01F 1/7086* | (2022.01) |
| *G01F 1/84* | (2006.01) |
| *G01F 11/28* | (2006.01) |
| *G01G 13/02* | (2006.01) |
| *G05D 7/06* | (2006.01) |
| *A01C 7/10* | (2006.01) |
| *G01F 13/00* | (2006.01) |

(52) U.S. Cl.
CPC .......... *G01F 1/7086* (2013.01); *G01F 1/8409* (2013.01); *G01F 1/845* (2013.01); *G01F 11/282* (2013.01); *G01G 13/024* (2013.01);

*G05D 7/0605* (2013.01); *A01C 7/102* (2013.01); *G01F 13/001* (2013.01)

(58) Field of Classification Search
CPC ...... G01F 1/8409; G01F 1/845; G01F 11/282; G01F 13/001; G01F 1/7086; G01G 13/024; A01C 7/102; G05D 7/0605
See application file for complete search history.

(56) References Cited

U.S. PATENT DOCUMENTS

| | | | | |
|---|---|---|---|---|
| 2002/0185316 A1* | 12/2002 | Carlson | ................ | G01G 13/024 |
| | | | | 177/16 |
| 2015/0208573 A1* | 7/2015 | Stevenson | .............. | A01C 19/02 |
| | | | | 222/333 |
| 2020/0025604 A1* | 1/2020 | Uebayashi | ........... | G01G 13/247 |

FOREIGN PATENT DOCUMENTS

| | | | | | |
|---|---|---|---|---|---|
| CA | | 3228256 A1 * | 4/2023 | ........... | G01G 11/043 |
| WO | WO-2008128558 A1 * | | 10/2008 | ........... | G01G 13/024 |

* cited by examiner

*Primary Examiner* — Benjamin R Schmitt
(74) *Attorney, Agent, or Firm* — Ryan W. Dupuis; Kyle R. Satterthwaite; Ade & Company Inc.

(57) ABSTRACT

A volumetric flow measuring and metering apparatus for flowable solids has an upright flow passage through which a flow of bulk material can pass. A speed sensor measures a speed of the flow. An actuator controls an obturating device operative relative to a bottom end of the flow passage. A controller receiving speed data from the speed sensor operates the actuator at least in part based on information contained in the speed data in a manner causing the bulk material to flow in the flow passage at a location of the speed sensor in a consolidated column-like flow.

20 Claims, 9 Drawing Sheets

FLOW MEASURING AND METERING APPARATUS FOR FLOWABLE GRANULAR SOLIDS

This application is a continuation-in-part of US parent application Ser. No. 18/299,740, filed Apr. 13, 2023.

FIELD OF THE INVENTION

The present disclosure relates generally to bulk material flow measurement and, more particularly, flow measuring and metering apparatuses for flowable granular solids.

BACKGROUND

Bulk material flow measurement and metering apparatuses exist. Some existing volumetric metering apparatuses are based on a principle of a rotating meter roll with flutes or groves, or cups that meter the bulk solid as the meter roll turns. Other types of apparatuses use a screw conveyor or auger to move material and use the speed of the screw conveyor or auger to determine a volumetric amount of material discharged from the conveyor.

A drawback to these existing apparatuses is that it takes energy to operate the meter. A large amount of energy could be needed to rotate meters. Additionally, changing the volume requires the meter to rotate faster or slower, the meter must have different-sized flutes or cups, or the pitch of the auger flighting must be changed. Thus, in most situations, changing speed is not easy to perform and requires complicated variable speed drives. Changing the volume of meter rolls is also difficult. Another drawback of existing metering systems is that they do not confirm if they are functioning correctly. They could be plugged up or running empty and give no outward indication and must rely upon totally separate systems to detect problems.

Accordingly, there is a need and desire to have a bulk material flow measuring and metering apparatus that overcomes the foregoing described and other drawbacks with existing measuring and metering apparatuses.

SUMMARY OF THE INVENTION

Advantages of features described in this disclosure may include, but are not limited to, those described below and herein elsewhere. The systems, apparatuses, methods, and other features described herein can improve the capability of measuring bulk material flow and metering the flow of bulk material.

In some implementations, volumetric flow measuring and metering apparatuses for flowable solids are provided that are energy efficient, have few moving parts, are easy to clean, and have a long service life.

In some implementations, volumetric flow measuring and metering apparatuses for flowable solids are provided that can be used on farms and in the industry to measure and control the flow of things like grain, seeds, fertilizer, and plastic pellets. In many instances these granular products and moved or conveyed from containers, bins, silos, and trucks, using augers, ducts, conveyors, and tubes.

In some implementations, volumetric flow measuring and metering apparatuses for flowable solids are provided that can be used in many different applications. The most simple as a standalone meter that could be fastened to the bottom of a container, e.g. bin, silo, or truck box, (there would have to be an opening or passage from the said container into the measuring container) then a simple toggle switch could control the flow of the product that was released. An instantaneous flow rate and totalized volume would be produced and displayed on a readout.

In some implementations, volumetric flow measuring and metering apparatuses for flowable solids are provided that can be integrated together with other machines and systems to improve their accuracy, efficiency, and safety.

In various aspects, flowable granular solids move in a mostly vertical direction down through a measuring chamber (flow passage) under the force of gravity. This measuring chamber (flow passage) has smooth, parallel, straight sides of a known cross-sectional area. A conical obturating structure is located inserted into the bottom of the measuring chamber (flow passage), and the bottom discharge edge of the measuring chamber acts like a valve seat against the conical obturating device. The distance between the bottom discharge edge and the obturating structure can be manipulated to control or throttle the volumetric amount of granular bulk solids traveling through the measuring chamber (flow passage). This Restriction of the granular bulk flowable solids ensures that the measuring chamber (flow passage) is always filled to capacity.

Also because of the shape of the conical obturating device and the smooth straight parallel sides of the measuring chamber (flow passage), the column of bulk granular solids in the upper part of the measuring chamber is always filled to a similar density and gives the appearance of moving together in a uniform flow as a cohesive unit. This causes the bulk granular solids in the measuring chamber (flow passage) to appear visually as a single larger object moving through the measuring chamber (flow passage) because the density is consistent.

An optical flow sensor or other sensor is used to measure the speed of the moving column when viewed through a transparent material, embedded in the smooth, straight wall of the measuring chamber. The sensor should be located at least 1.5 times the diameter above the obturating cone-shaped obturating device. A cumulative distance measurement is also produced as the image of what appears as a solid is measured by the optical flow sensor as it passes the transparent window located in the measuring chamber. This measurement is calibrated against known time and distance units. These speed and length measurements are multiplied by the area of the measuring chamber to calculate the instantaneous flow rate and or the total volume of solids that have flowed through the measuring chamber (flow passage) in a given time. The flow rate and, or total volume can be manipulated by raising or lowering the cone-shaped obturating device by a mechanical means to different distances for different lengths of time.

In an aspect, a volumetric flow measuring and metering apparatus for flowable solids is provided. The apparatus has a flow passage that is generally arranged vertically and has opposite open top and bottom ends through which a flow of bulk material may be passed. A speed sensor is disposed to measure a speed of the bulk material flowing through the passage and output a data signal having information about the speed of the bulk material flow. An obturating device is positioned at the bottom end of the flow passage and is movable in a linear direction toward and away from the bottom end. An actuator is operably connected to the obturating device and operable to selectively position the obturating device relative to the bottom end of the flow passage. A controller is operably connected to the speed sensor and the actuator, and the controller operates to receive speed data from the speed sensor and to operate the actuator at least in part based on information contained in the speed data about the speed of the bulk material flowing through the passage.

In aspects, the flow passage can have a sidewall with a section thereof provided with a transparent material, and the speed sensor can be disposed exteriorly of the flow passage and aligned with the transparent material such that the optical sensor can operate to measure the speed of the bulk material flowing through the passage through the transparent material.

In aspects, the flow passage has a circular cross-sectional area. In other aspects, the obturating device is conically or frusto-conically shaped and its apex is positioned along a central axis of the flow passage. In yet further aspects, the volumetric flow measuring and metering apparatus may further have a vibrator operably connected to the flow passage and being operatable to impart a vibrational force in the bulk material flowing through the flow passage.

In some aspects, the flow passage is provided by a cylindrically shaped tube. In other aspects, the speed sensor is an optical sensor, and the optical sensor can be an optical linear displacement sensor that operates to measure the speed of a surface moving relative to the sensor. In further aspects, the volumetric flow measuring and metering apparatus may have a user interface operably connected to the controller.

In one aspect, the controller operates the actuator to maintain the speed of the bulk material within a prescribed threshold range, the prescribed threshold range being determined to cause the bulk material to flow in the flow passage in said consolidated column-like flow.

In one aspect, the obturating device is movable in a linear direction toward and away from the bottom end of the flow passage.

In an aspect of the invention, a cross-sectional shape of the flow passage is constant along a portion of length of the passage at and immediately above the speed sensor.

In aspects, the flow passage is defined in a tube and wherein the tube is mounted inside a bulk material storage vessel. When the bulk material storage vessel includes a bottom discharge for discharging contents of the bulk material storage vessel therethrough, the obturating device may be operable to open and close the bottom discharge of the bulk material storage vessel.

In one aspect, a baffle device is supported in operative relation to open top end of the flow passage about which bulk material must flow to enter the flow passage.

In aspects, the obturating device is operative relative to a discharge opening in a lower boundary structure and the bottom end of the flow passage is spaced above the lower boundary structure such that bulk material piled on the lower boundary structure in a closed position of the obturating device closes the bottom end of the flow passage.

In one aspect, a height of the speed sensor relative to the obturating device is equal to or greater than a diameter of the flow passage.

According to one aspect of the present invention there is provided a volumetric flow measuring and metering apparatus for flowable solids, the apparatus comprising:

a flow passage that is generally arranged in an upright orientation and has opposite open top and bottom ends through which a flow of bulk material may be passed;

a speed sensor disposed to measure a speed of the bulk material flowing through the passage and output a data signal having information about a speed of the bulk material flow;

an obturating device operatively located relative to the bottom end of the flow passage;

an actuator operably connected to the obturating device and operable to selectively position the obturating device relative to the bottom end of the flow passage so as to controllably vary discharge from the bottom end of the flow passage; and a controller operatively connected to the speed sensor and the actuator;

wherein the controller is configured to (i) receive speed data from the speed sensor about the speed of the bulk material flowing through the passage and (ii) operate the actuator at least in part based on information contained in the speed data in a manner causing the bulk material to flow in the flow passage at a location of the speed sensor in a consolidated column-like flow.

The controller preferably operates the actuator to maintain the speed of the bulk material within a prescribed threshold range, the prescribed threshold range being determined to cause the bulk material to flow in the flow passage in said consolidated column-like flow.

According to a second aspect of the present invention there is provided a volumetric flow measuring and metering apparatus for flowable solids, the apparatus comprising:

a tube defining a flow passage that is generally arranged in an upright orientation and has opposite open top and bottom ends through which a flow of bulk material may be passed;

an outer structure receiving the tube therein;

one or more electrical load cells connecting the tube to the outer structure such that the tube is suspended in the outer structure, the load cells being operable to measure the weight of the tube;

an obturating device operatively located relative to the bottom end of the flow passage;

an actuator operably connected to the obturating device and operable to selectively position the obturating device relative to the bottom end of the flow passage so as to controllably vary discharge from the bottom end of the flow passage; and a speed sensor disposed to measure a speed of the bulk material flowing through the passage and output a data signal having information about a speed of the bulk material flow; and a controller operatively connected to the speed sensor, the one or more electrical load cells and the actuator;

wherein the controller is configured to (i) receive speed data from the speed sensor about the speed of the bulk material flowing through the passage, (ii) receive weight data from the one or more electrical load cells about the weight of the tube, and (iii) operate the actuator at least in part based on information contained in either one or both of the weight data and the speed data in a manner causing the bulk material to flow in the flow passage in a consolidated column-like flow.

According to a further aspect of the present invention there is provided an agricultural implement for delivering a flowable solid onto the ground, the implement comprising:

a delivery system for delivering the solids to the ground as the implement is towed across the ground;

a metering apparatus for metering the solids into the delivery system at a prescribed flow rate, the metering apparatus comprising:

a flow passage that is generally arranged in an upright orientation and has opposite open top and bottom ends through which a flow of bulk material may be passed;

a speed sensor disposed to measure a speed of the bulk material flowing through the passage and output a data signal having information about a speed of the bulk material flow;

an obturating device operatively located relative to the bottom end of the flow passage;

an actuator operably connected to the obturating device and operable to selectively position the obturating device relative to the bottom end of the flow passage so as to controllably vary discharge from the bottom end of the flow passage; and a controller operatively connected to the actuator, the controller being configured to (i) receive speed data from the speed sensor about the speed of the bulk material flowing through the passage and (ii) operate the actuator at least in part based on information contained in the speed data in a manner causing the bulk material to flow in the flow passage at the prescribed flow rate;

wherein the flow passage is sized to cause the bulk material to flow in the flow passage at a location of the speed sensor in a consolidated column-like flow at the prescribed flow rate.

In an aspect, the controller is further configured to compare the speed data to at least one alert criterium indicative of a blockage or a lack of solids in the flow passage, and (ii) determine an alert condition if the speed data meets said at least one alert criterium.

In one aspect, the implement further comprises at least one auxiliary sensor disposed in a solids supply line supplying the bulk material to said flow passage to measure a flow characteristic of solids flowing in the solids supply line, the controller being further configured to (i) receive flow data from the at least one auxiliary sensor about flow characteristics of the bulk material flowing through the passage and (ii) operate the actuator at least in part based on information contained in the flow data.

Numerous additional objects, features, and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages, and the specific objects attained by its uses, reference should be had to the accompanying drawings and descriptive matter in which there are illustrated embodiments of the invention.

BRIEF DESCRIPTION OF THE DRAWINGS

Some embodiments of the invention will now be described in conjunction with the accompanying drawings in which.

In the drawings like characters of reference indicate corresponding parts in the different figures.

DETAILED DESCRIPTION

Figure 1:
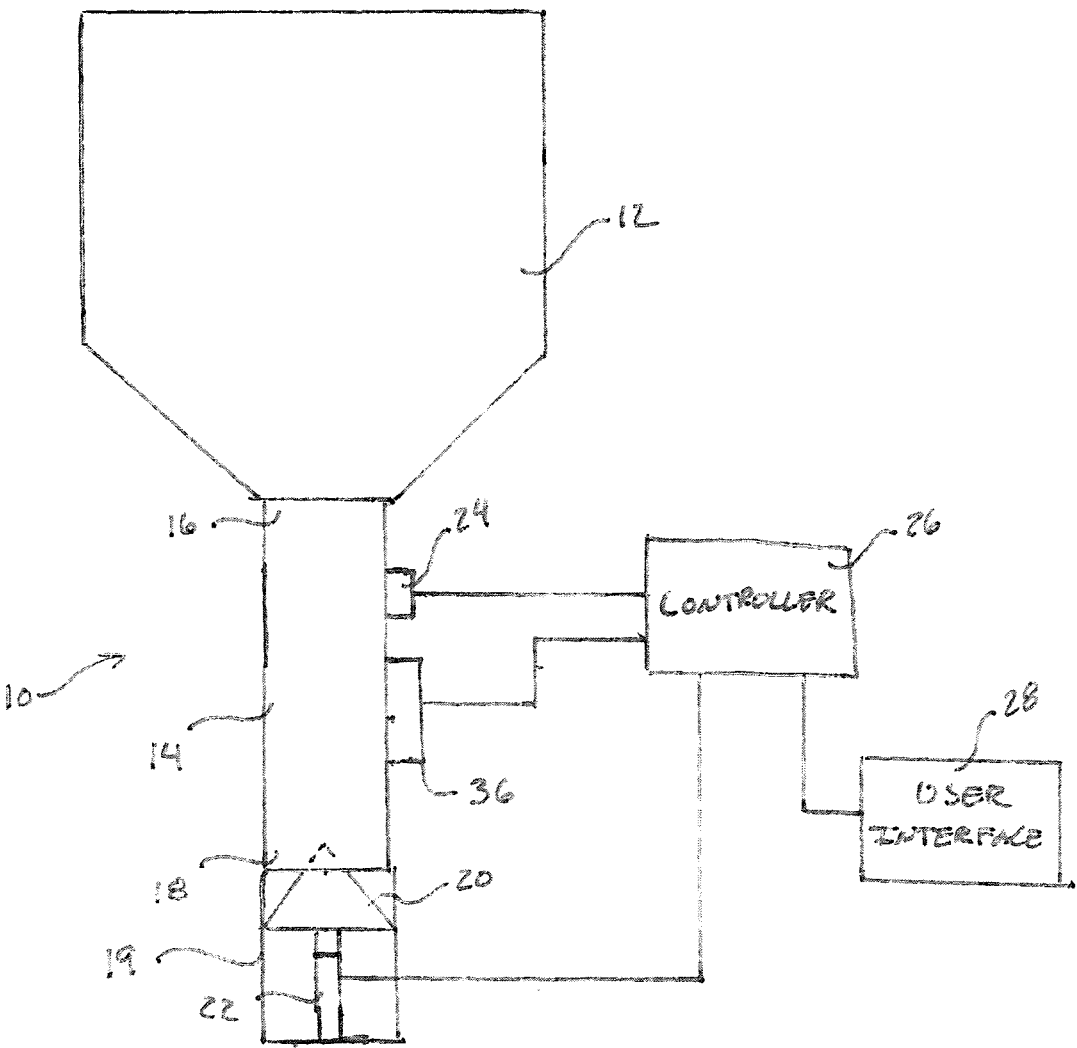
FIG. 1 is a schematic diagram illustrating one embodiment of a bulk material flow measuring and metering apparatus.

FIG. 1 is a schematic diagram illustrating one embodiment of a bulk material flow measuring and metering apparatus 10. In aspects, apparatus 10 is configured and is operated to measure a flow of bulk material as it is discharged from a container or is moved in a process stream. In other aspects, apparatus 10 is further configured to control or meter bulk material flow. As further discussed herein, apparatus 10 is configured and operated to cause bulk material flowing therethrough to flow in a cohesive, consolidated state that is loose enough such that material can still flow under the force of gravity, but consolidated enough that the material generally flows as a continuous, consolidated column of material.

As a non-limiting example, apparatus 10 is useful to measure and meter the flow of bulk material such as for example grain, seeds, fertilizer, and pellets. Apparatus 10 can be implemented on various agricultural equipment and/or industrial equipment wherein there is a need to know the volumetric flow and/or the mass flow of bulk material and in certain applications control or meter the flow of bulk material.

In FIG. 1 apparatus 10 is shown attached to a container, such as a hopper 12 for example that is configured to hold flowable bulk material. Conventionally, hopper 12 is configured with an opening at its bottom through which the bulk material contained in the hopper may flow through. As shown, apparatus 10 is connected to the bottom of hopper 12 to receive bulk material as it flows out of the hopper opening. As will be discussed in further detail below, apparatus 10 is configured and operates to measure bulk material flow from the hopper and can be further configured to control or meter the bulk material discharge from the hopper.

Apparatus 10 has a structure 14, representatively shown here as a cylindrically shaped tube, that is attached at one end 16 to the bottom of hopper 12 to receive bulk material from the hopper into the tube. A metering device 19 is located at the opposite end 18 of the tube 14. The metering device 19 has a closure 20 and an actuator 22 is operatively connected to closure 20 and is operated to move closure 20 toward and away from end 18 of tube 14 to control the flow of bulk material through the tube. Apparatus 10 further has a sensor 24 that is configured to measure the speed of bulk material as it flows through tube 14. Sensor 24 and actuator 22 are each operatively connected to a controller 26. Controller 26 is configured or otherwise programmed to receive flow data from sensor 24. The flow data received from sensor 24 can be used by controller 26 to control actuator 22 to position closure 20 to adjust or meter the flow of bulk material through tube 14. A user interface 28 may be provided and operatively connected to controller 26. User interface 28 may have a display for displaying various operational parameters and may have inputs allowing a user to adjust various operational parameters.

Figure 2:
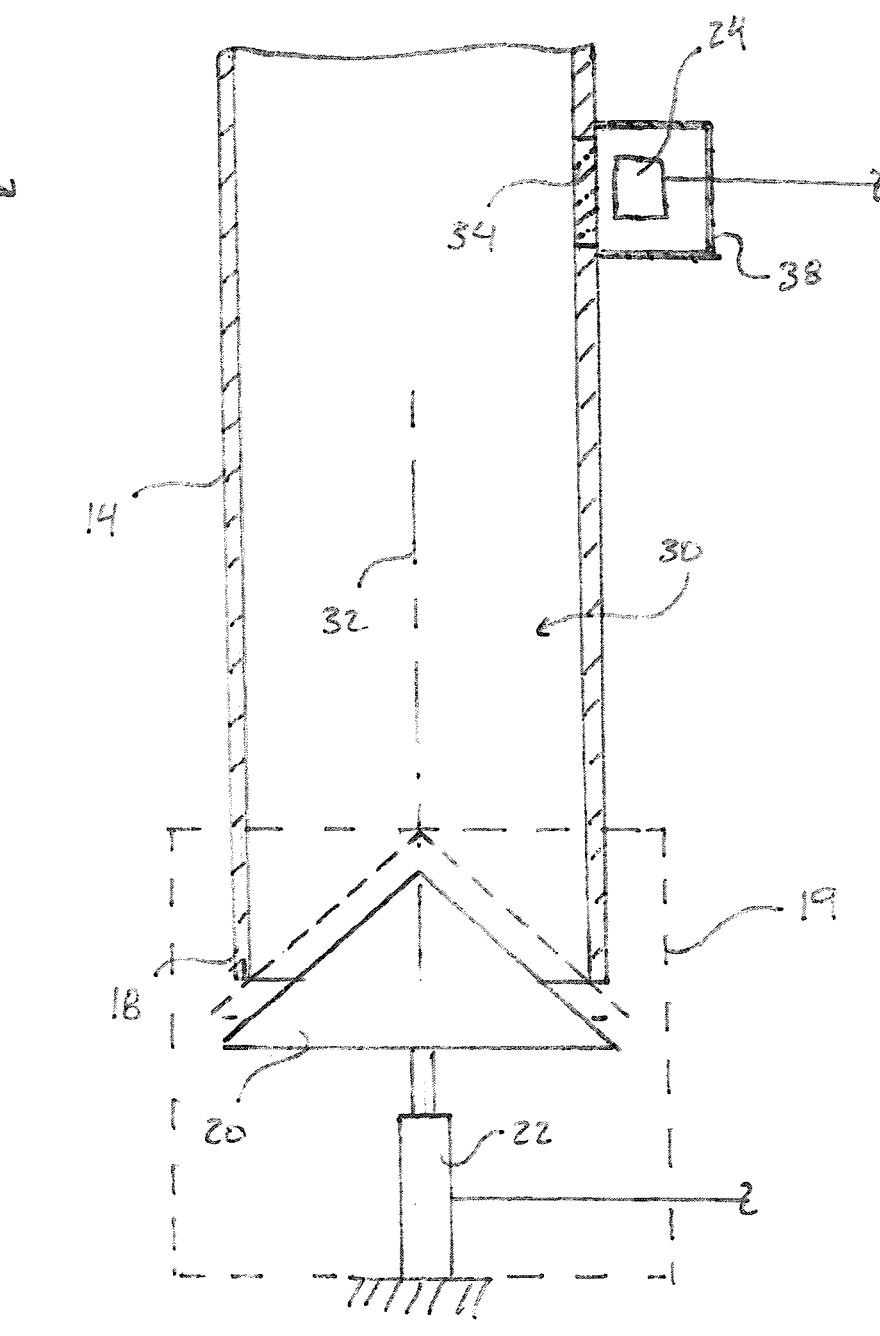
FIG. 2 is a schematic cross-sectional diagram of the bulk material flow measuring and metering apparatus.
Figure 3:
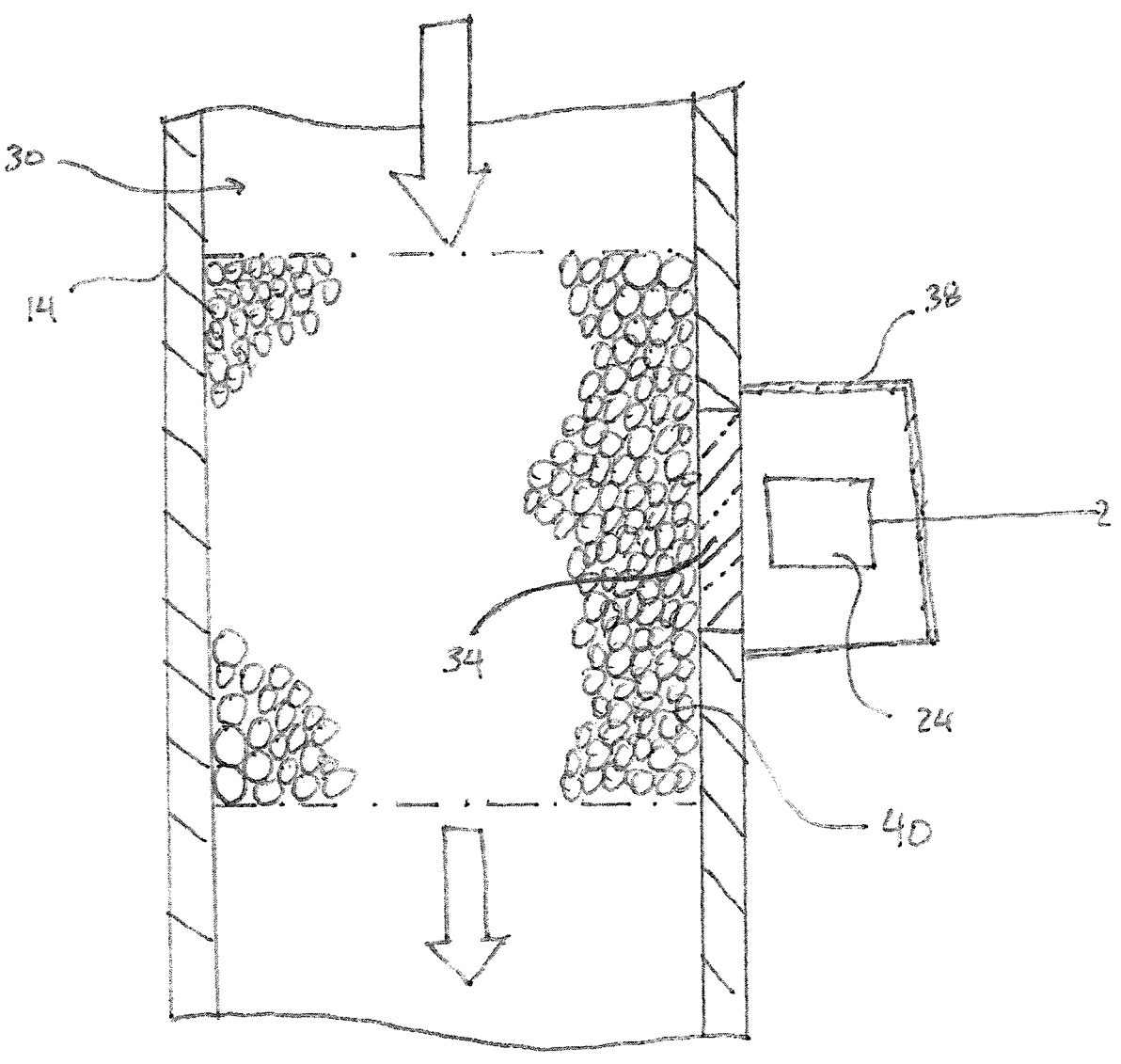
FIG. 3 an enlarged, schematic cross-sectional diagram of the bulk material flow measuring and metering apparatus.

With additional reference to FIGS. 2 and 3, structure 14, again representatively shown as a cylindrically shaped tube has a straight flow passage 30 that extends through the tube. While structure 14 is shown as a cylindrically shaped tube having a circular cross-section, this structure is not so limited. Rather, any structure could be provided that has a flow passage for the flow of bulk material 40 wherein the flow passage is generally straight with parallel, smooth sides. However, for reasons discussed herein, it is preferable for flow passage 30 to have a circular cross-section, as representatively shown, to promote a cohesive, consolidated column-like flow of the bulk material in the flow passage. Regardless of the particular cross-sectional shape, it is desired that the cross-sectional shape be constant in shape and size along a portion of the length of the flow passage at or overlapping the speed sensor and extending immediately above the speed sensor to ensure a cohesive, consolidated column-like flow of the bulk material at the measurement location of the speed sensor. The material used to make the apparatus should provide the interior wall surface of the flow passage with a low coefficient of friction to further promote a cohesive, consolidated column-like flow of the bulk material in the flow passage.

Within the context of this disclose, a cohesive, consolidated column-like flow of the bulk material is understood to comprise a flow of the material in which the adjacent particles of solid material are closely abutted and nestled relative to one another such that there is a minimum of unoccupied space between the particles and such that the particles move together along the flow passage as a single, uniform, solid mass of particles which are substantially static relative to one another as they move along the flow passage. Ideally the particles of the solid bulk material are sufficiently compacted relative to one another that the overall density of the consolidated column-like mass of particles is within 10 percent of a test weight density of a grain sample as defined by the Canadian Grain Commission.

Closure 20 is disposed relative to end 18 of the tube and is supported for linear movement toward and away from the end. As shown, closure 20 is conically or frusto-conically shaped with its apex directed toward end 18 and positioned along the central axis 32 of the flow passage 30. The position of closure 20 relative to end 18 controls the flow of bulk material 40 through flow passage 30. Closure 20 may be positioned in sealing contact with end 18 to stop the flow through passage 30. The closure 20 may be selectively positioned away from end 18 to control characteristics of the flow of bulk material through passage 30. Flow characteristics may include the speed at which the bulk material flows through the passage, for example, to promote a consolidated, cohesive flow of the bulk material.

A conically or frusto-conically shaped closure 20 has several advantages. Only a short range of movement relative to end 18 is needed to stop or control the flow of bulk material through passage 30. Further such a closure is less prone to plugging or blockages like other closures such as slide gates. And there is less friction compared to other closures like slide gates. Further, if a bridge or blockage forms, the closure can be moved toward and away from end 18 to clear the blockage.

Additionally, in aspects, because the cone-shaped closure is located with its apex at the central axis of the flow passage it is also located at the center of the flow of the bulk material and when partially opened (e.g., moved in a direction away from the end 18), the closure slows down the flow in the center of the column of bulk material. The angle, length, and surface of the cone-shaped closure affect how much the bulk material is slowed down when partially open. The cone shape is also important because the pointed uppermost part of the cone shape is in the center of the column of flowing bulk material it acts to evenly slow down and separate the material and allow the material to move through the gap between the closure and the end 18.

Actuator 22 is operatively connected to closure 20 and is operated to move the closure 20 relative to end 18 to control the desired flow characteristics of the bulk material. Actuator 22 can be any device that is configured to cause a linear motion of the closure 20. For example, actuator 22 could be a hydraulic or pneumatic actuator or an electric linear actuator. Further actuator 22 may communicate position feedback data to be used to control its activation and positioning.

Sensor 24 is positioned and configured to measure the speed of the bulk material flowing through passage 30 without contacting the material. Preferably, sensor 24 is an optical linear displacement sensor that operates to measure the speed of a surface moving relative to the sensor. In an aspect, and as a non-limiting example, sensor 24 could be an ADNS-3080 Optical Flow Sensor Module. However, other non-contact linear displacement sensors that operate to measure the speed of a passing surface could be used. Additionally, machine vison using one or more cameras could be used to measure the speed of the bulk material flowing through passage 30.

The consolidated column of bulk material 40 flowing through passage 30 will be seen by sensor 24 as a continuous surface moving linearly in the passage. To this end, sensor 24 can measure the speed of the column of bulk material as it passes across a measurement point along the passage.

As representatively shown, tube 14 has a transparent window or section 34 in its sidewall. Sensor 24 is positioned exteriorly of tube 14 and aligned with window 34 so that the sensor has a clear optical view of the bulk material in passage 30. Preferably, sensor 24 is located 1.5 times the internal diameter of passage 30 above the closure to ensure the sensor can accurately measure the speed of the consolidated column of bulk material as it flows or moves through the passage. If sensor 24 is located too close to end 18, the sensor will not likely provide an accurate speed measurement because the consolidated flow of the bulk material will be disrupted in passage 30 near the position where the material exits end 18.

A dust cover 38 or enclosure can be provided to enclose sensor 24 and prevent it from becoming soiled by the operating environment of the apparatus, which otherwise may interfere with its operation and accuracy.

Controller 26 can be a programmable logic controller and is operatively connected to actuator 22 and sensor 24. Controller 26 can be programmed to operate in various operational configurations or functions. In a primary aspect, controller 26 is programmed to receive data from sensor 24, and from this data determine a volumetric flow of bulk material through passage 30. For instance, the data received from sensor 24 can include information relating to the speed at which the consolidated column of bulk material is flowing through passage 30. Controller 26 can use this speed information to calculate the volumetric flow of the bulk material by using the known cross-sectional area of the passage at the location where the sensor measures the speed. And, if the density of the bulk material is known, a mass flow rate of the bulk material can be calculated from the calculated volumetric flow of the bulk material.

The calculated volumetric flow or mass flow of the bulk material 40 can be displayed on a display, such as a display of the user interface 28. In aspects the momentary flow rate (volumetric and/or mass) can be displayed and/or an average flow rate over time can be displayed.

In aspects controller 26 can be programmed to operate actuator 22 to position closure 20 to achieve the desired volumetric flow or mass flow rate of the bulk material 40. For example, controller 26 can be programmed to and/or operate actuator 22 to position closure 20 to achieve a desired consolidated, columnar flow of bulk material in tube 14 for measuring its flow rate. This can be achieved by operating the actuator to maintain the speed of the bulk material within a prescribed speed threshold range which has been determined to cause the bulk material to flow in the flow passage in the stated consolidated column-like flow. In aspects, controller 26 can be programmed to operate actuator 22 to position closure 20 to achieve a desired total volume or mass of bulk material dispensed from hopper 12 or the like. For example, controller 26 can be programmed to automatically operate actuator 22 to position closure 20 to achieve a desired periodic flow rate or a flow rate over time to reach a desired total discharge volume or mass of the bulk material.

In aspects, user interface 28 can communicate with controller 26. User interface 28 can be provided in many formats. For instance, as a non-limiting example, a user interface could be provided by a software application running on a computing device like a desktop or laptop computer, or by a software application running on a mobile device like a smartphone, tablet, or the like.

The user interface 28 may provide a location for a user to input data or commands to controller 26 as well as allow controller 26 to provide an indicator to the user. In a non-limiting example, user interface 28 may have a touchscreen. The touch screen may have a plurality of user-selectable inputs displayed thereon that allows the user to communicate an input preference to the controller 26. In other aspects, the user interface 28 may be buttons and switches among other things positioned on a dash and selectable by a user. The user interface 28 may provide indicators to the user regarding actions and observations of the actuator 22, the sensor 24, and/or the controller 26. User interface 28 may be configured to allow a user to manually operator actuator 22 to position the closure 20 to achieve a desired flow of the bulk material.

In aspects, apparatus 10 may further include a vibrating device 36 that is operatively connected to structure 14 to induce a vibrational motion in the bulk material 40 in passage 30. The vibrating device 36 may be operatively connected to controller 26 and the controller may operate to control the operation of the vibrating device to meet desired flow characteristics of the bulk material in passage 30. For example, the vibrating device 36 may be operated to induce or promote a desired consolidated flow in the bulk material 40 in passage 30 by causing a vibrational force on the bulk material in the passage. In another example, the vibrating device may be operated to break up a blockage or bridge in the bulk material in passage 30.

While controller 26 is used throughout, the teachings of this disclosure may be implemented by any one or more controllers. More specifically, controller 26 can be any controller or combination of controllers capable of communicating with one or more of the actuator 22, sensor 24, vibrator 36, and user interface 28, or other sensors and/or controllers of equipment in which the apparatus 10 is used in conjunction. Further, controller 26 may contain or otherwise have access to a processor for executing commands and a memory unit for storing algorithms, charts, measured values, sensor readings, threshold values, or any other data or the like. Accordingly, while a single controller 26 is illustrated, this disclosure contemplates using any known control device or combination of control devices to implement the logic and teachings discussed herein.

Figure 4:
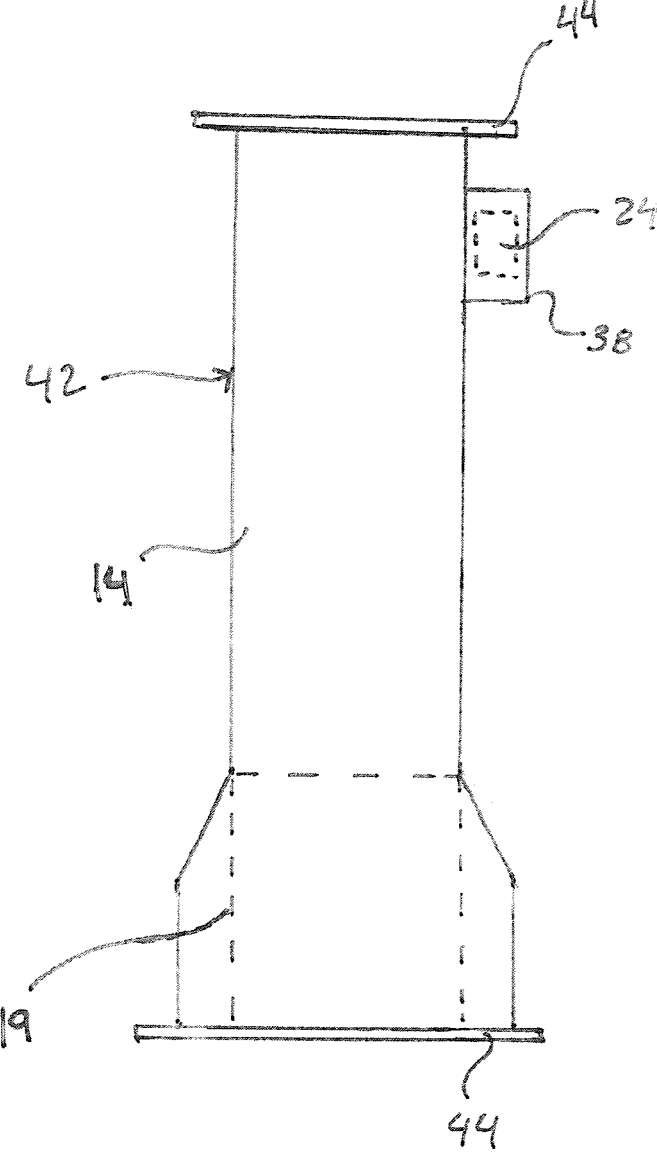
FIG. 4 is a schematic diagram illustrating an embodiment of an assembly including the bulk material flow measuring and metering apparatus.

Apparatus 10 may be packaged in an easily deployable assembly for implementing one or more of the apparatuses in various types of equipment. In FIG. 4 there is diagrammatically illustrated an assembly 42. In an aspect, the assembly is configured to operatively house the various components of apparatus 10 in a single, deployable package that can be easily connected to various equipment to measure and/or control bulk material flow in the equipment. In an aspect, the assembly 42 may include mounting flanges or surfaces 44 at opposite ends that provide connection points to the equipment. It is important to note that an assembly may take on various form factors as necessary depending on the equipment configuration in which the assembly is to be used in conjunction. Accordingly, the diagrammatically illustrated assembly as illustrated in FIG. 4 should not be considered limiting.

Figure 5:
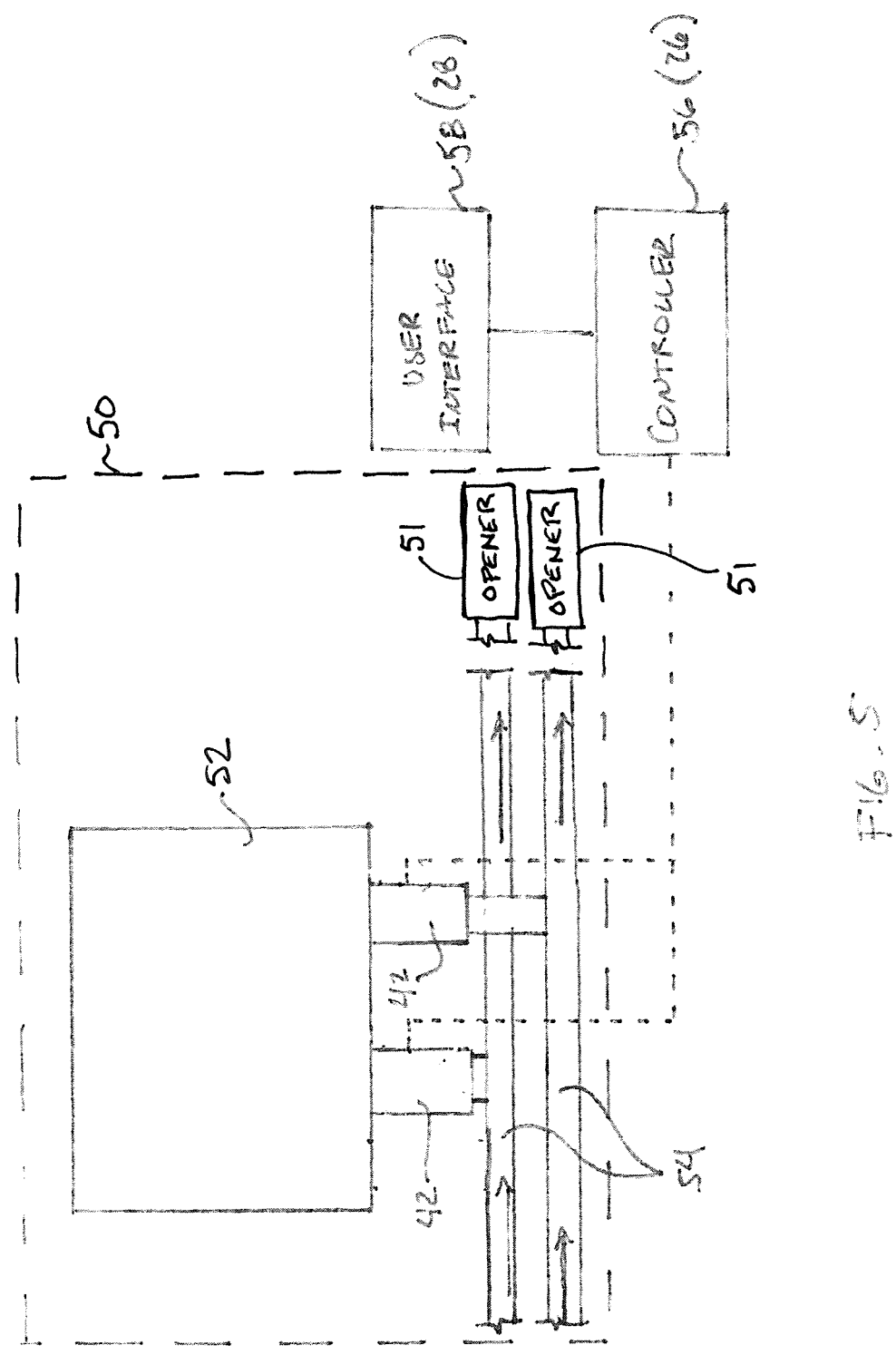
FIG. 5 is a schematic diagram illustrating an embodiment of an assembly including the bulk material flow measuring and metering apparatus in use in conjunction with a piece of equipment.

In FIG. 5 there is a schematic illustration of an embodiment in accordance with this disclosure that shows multiple apparatuses 10 in each provided in a separate assembly 42 being used with in connection equipment 50 to measure and meter a flow of bulk material in the equipment. As a non-limit example, equipment 50 could be agricultural equipment such as for example an air seeder or other type of seeder and/or fertilizer distribution equipment that is driven or towed across the ground to distribute the seed and/or fertilizer. These types of equipment are well known, and a complete illustration and discussion of such equipment are not necessary for an understanding.

As illustrated, equipment 50 has a container 52 for holding a quantity of bulk material (i.e., seed and/or fertilizer) that is to be metered from the container into to one or more distribution lines 54 (representatively two) of a pneumatic delivery system for discharging the material from the equipment. When the equipment 50 has a frame supporting furrow openers 51 thereon which are arranged to form furrows in the ground as the frame is towed across the ground in a forward working direction, the pneumatic delivery lines 54 deliver the flowable solids material to the openers 51 to deposit the material into the furrows in the ground. A plurality of apparatuses 10 are provided with each as an assembly 42 and with each assembly connecting container 52 to one distribution line 54 to measure the flow rate and/or meter the flow of bulk material into the distribution lines. As further shown, each assembly 42 (containing device 10) is operably connected to communicate with controller 56. In such an implementation controller 56 could take the place of controller 26 on each apparatus 10 or controller 26 on each apparatus can be configured to connect with a master controller 56 when multiple apparatuses are implemented together. Master controller 56 can have the same configurations and functional programming as discussed above. A user interface 58 can communicate with controller 56 and can be configured in the same way interface 28 discussed above.

To this end, each apparatus 10 can be individually operated to measure a flow of bulk material from the container into a respective distribution line 54 and, if desired, operated to meter the amount of bulk material that is discharged from the container into a distribution line. Each apparatus 10 can be controlled to meet the demand or desire of bulk material distribution by equipment 50. For example, variable rate and section control, which is a control methodology known in the field, could easily implemented in the control of each apparatus as desired.

The flow passage in this instance is sized so that the material flows in the flow passage at the location of the speed sensor in the stated consolidated and column-like manner throughout the entire range of desired metered rates for distribution of the flowable solids by the equipment 50. Accordingly, once the user sets a prescribed metering or flow rate to be achieved within the range of desired metered rates, the controller 26 functions to operate the actuator to achieve the prescribed flow rate, which in turn ensures that the material will flow in a consolidated manner for effective measuring of volumetric flow using the speed sensor data as an input.

In the instance of equipment 50, the apparatus 10 may be further configured to compare the speed data to at least one alert criterium stored on the controller. The alert criterium may be a minimum speed threshold or a speed threshold range that is indicative of a flow in the flow passage that is moving much slower than expected or may be indicative of an absence of material in the flow passage, for example due to a blockage of the flowable solids in the flow passage or upstream of the flow passage or due to an empty container 52 supplying the flowable solids to the flow passage. The controller compares the speed data to the criterium in real-time and instantaneously determines an alert condition if/when the criterium is met. The controller may be further configured to generate an alert notification to the user in response to determination of the alert condition, for example by sending a notification to the user interface 28, or by communication the notification over a communications network to a computer device of the operator of the equipment 50.

Deployment or use of apparatus 10 is not limited to the illustrative examples discussed above and one or more apparatuses can be used in many different applications with many different types of equipment wherein knowing the flow rate of a bulk material is desired and in certain applications metering the bulk material is desired.

Figure 6:
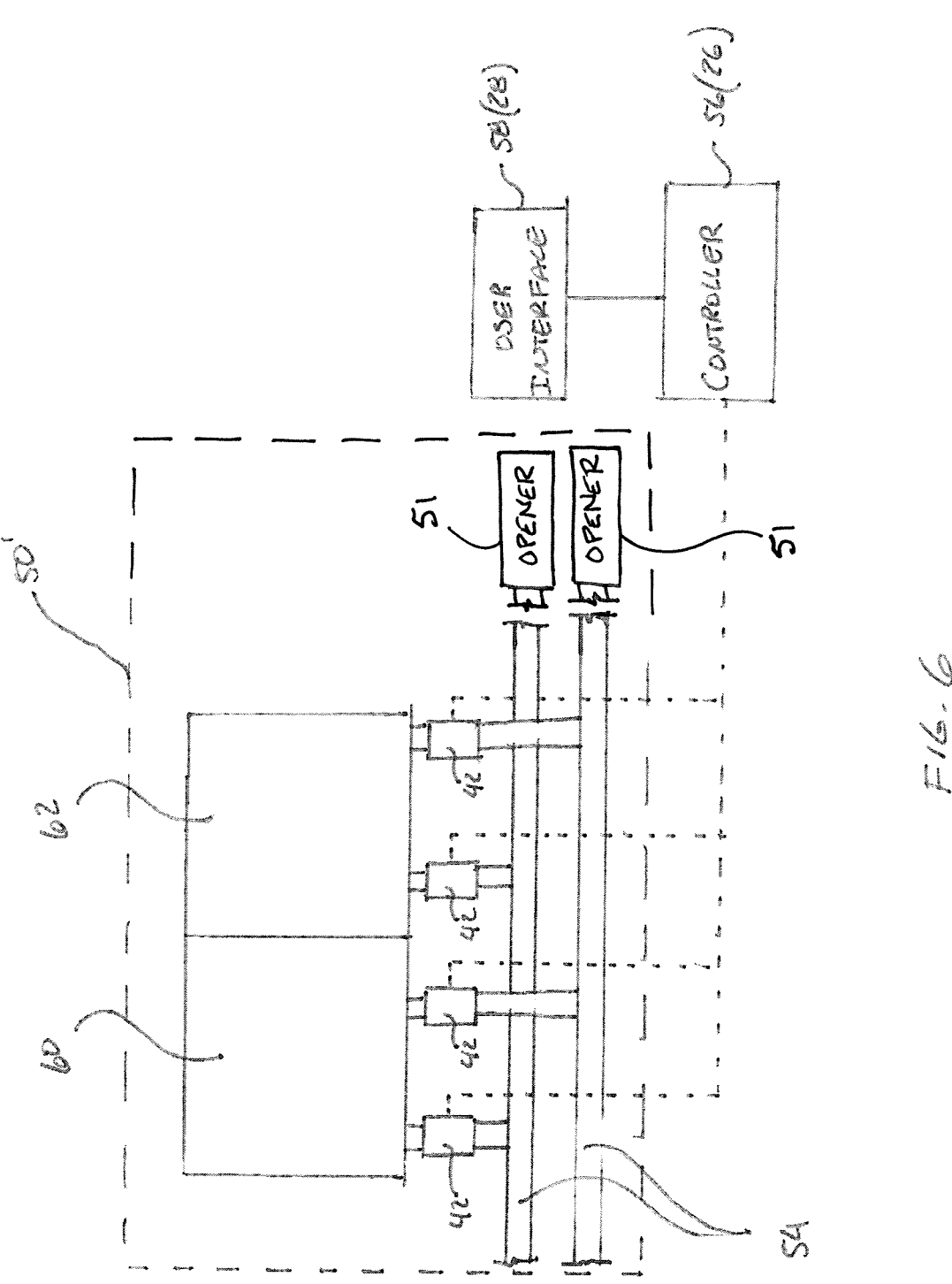
FIG. 6 is a schematic diagram illustrating an embodiment of an assembly including the bulk material flow measuring and metering apparatus in use in conjunction with a piece of equipment.

In FIG. 6 there is a schematic illustration of an embodiment in accordance with this disclosure that shows multiple apparatuses 10 in each provided in a separate assembly 42 being used with in connection equipment 50' to measure and meter a flow of bulk material in the equipment. Equipment 50' is like equipment 50 discussed above and but instead of a single container, equipment 50' can have multiple material containers, representatively containers 60 and 62. Each container 60 and 62 can hold a different type of material that can be metered into a flow line 54 (representatively two) for distribution by the equipment. The purpose of this illustration or embodiment is to highlight the scalability and flexibility of the apparatus in its use with various types of equipment.

Figure 7:
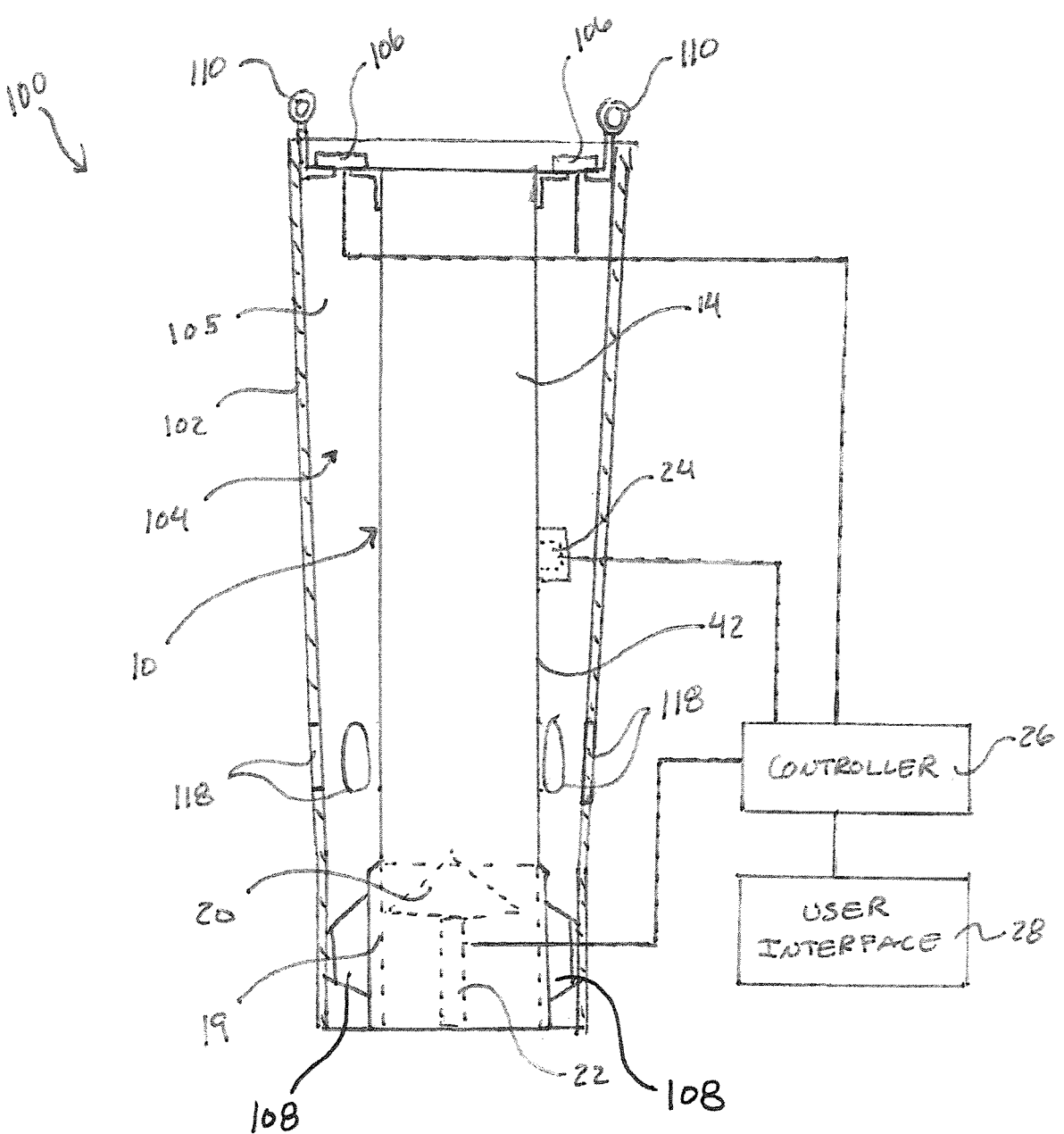
FIG. 7 is a schematic diagram illustrating an embodiment of a bulk material flow measuring and metering and density measuring apparatus.

FIG. 7 is a schematic diagram illustrating an embodiment of a bulk material flow and density measuring apparatus 100. Apparatus 100 includes the bulk material flow measuring and metering apparatus 10 discussed above and in addition to the functional aspects of apparatus 10, it is configured to measure density of a bulk material.

As shown, apparatus 100 includes an outer structure or chute 102 receiving the tube 14 therein. The chute 102 has a flow passage 104 extending between its opposite open ends. Apparatus 10, shown as assembly 42, is positioned within chute 102 forming an annulus 105 between apparatus 10 and the interior surface of the chute. Assembly 42 is suspended, representatively at the top end of tube 14, in its position in chute 12 one or more load cells 106 that are connected to the chute and the tube and are radially spaced around the top end of the assembly. The lower end of assembly 42 can be centered in chute 102 by a plurality of shoes 108 that are fixedly attached to the assembly and movable relative to the interior surface of the chute. Alternatively, shoes 108 may be fixedly attached to the interior surface of the chute and movable relative to the exterior surface of the assembly. The upper end of chute 102 may have a plurality of lifting or suspension points 110 that allow the chute to be suspended and/or lifted from above.

A load cell 106 is an electro-mechanical sensor used to measure weight. Load cells are well known and a description of their structure and function are not necessary for an understanding here. One or more load cells 106 are operatively connected to controller 26 to receive data from the load cells. The data has information pertaining to a weight measured by the load cell. The controller 26 is programmed to receive this data from the load cell 106 and determine a weight measured by the load cell.

In an aspect, data from the load cells 106 would be received by controller 26. Controller 26, using this data, operates actuator 22 to open and close closure 20 to maintain the measured weight within a pre-determined range which corresponds to the flowable solids being within a threshold range of heights based on the density of the material being handled. This range is between 100% full to overflowing the passage 104, and a weight where the height or level of flowable granular solid is higher than the speed sensor 24. By using the information from the load cells 106 to control the positioning of the closure 20 via the actuator 22, the height or level of the top of the column of consolidated moving granular solids will always be above the speed sensor 24 and lower than the top of tube 14. Thus, all the flowable solids that pass through 100 would be volumetrically measured.

The load cells 106 output a data signal having information from which weight can be inferred that is communicated to the controller 26. The controller 26 can rely on the data input by the load cells 106 as a basis for controlling the actuator 22 to maintain the flowable solids within the threshold range of heights independently of the speed data from the speed sensor. In this instance, the speed data from the speed sensor may be used only in the calculation of the volumetric flow rate or for comparison to alert criteria to indicate a blockage and the like for example.

In addition to the functional aspects provided by apparatus 10, discussed above, apparatus 100 can be used to measure the density of bulk material. For example, controller 26 can be programmed to perform a density measurement function. In such a function, controller 26 operates actuator 22 to move closure 20 into the closed position wherein bulk material cannot flow through tube 14. Tube 14 is filled with bulk material to capacity and a weight measurement of the tube filled with the bulk material is taken. Using this weight measurement with the known volume of the tube when the closure is in the closed position, the density of the bulk material may be determined by the controller. The calculated density can be displayed on the user interface 28 and/or stored for use in additional calculations or in providing information to a user.

During the filling of tube 14 with bulk material any material overflow falls through chute 102 in the annulus 105 and is discharged through the bottom end of the chute. To this end, chute 102 capture and direct any bulk material overflowing tube 14 and direct the material overflow to the same location as if the material was flowing through apparatus 10.

Apparatus 100 has many applications. For example, apparatus 100 could also be used on the discharge of grain augers when filling trucks or silos and measurement information (e.g., flow rate and/or material density) could be cross-referenced with truck scales and inventory systems to provide a total inventory system for a farm or commercial operation. In another example, anytime a grain auger is used to transfer granular bulk flowable solids apparatus 100 can measure the volume and/or density of material transferred and send that information to an inventory control system. This system could be used to fill bins of a known size. The capacity of a bin could be entered. When the bin was almost full a visual or audible alarm would turn on to alert the operator or stop filling.

Figure 8:
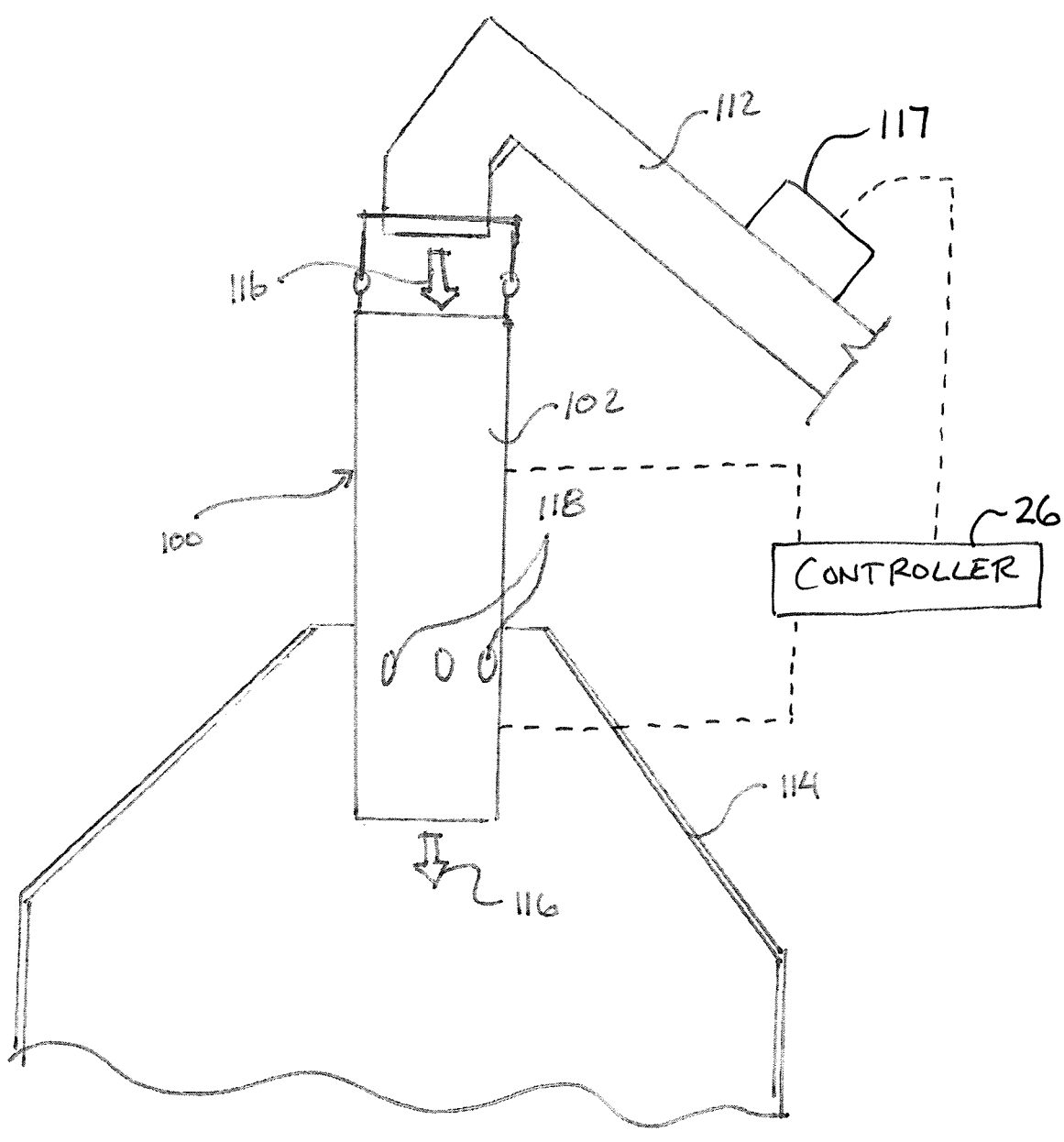
FIG. 8 is a schematic diagram illustrating an embodiment of an assembly including the bulk material flow measuring and metering apparatus in use in conjunction with a piece of equipment.

FIG. 8 is a schematic illustration of an example use of apparatus 100. As illustrated, apparatus 100 is suspended from the discharge end of a bulk material elevator 112 (i.e., a grain elevator) and positioned in the fill opening of a silo or bin 114 that is to be filled with material from the elevator. Bulk material 116 discharged from elevator 112 is directed through apparatus 100 and from the apparatus into the interior of silo 114. Apparatus 100 can be operated to measure the flow rate of the material into silo 114. Apparatus 100 can also be operated to measure the density of the material in the manner described above.

As further shown, apparatus 100 can have overflow holes 118 formed through chute 102 at a location that is positioned above the location of the closure. The overflow holes 118 allow material to continue to flow into the silo 114 in situations where the material has backed up into the apparatus such as when the silo is almost full or when there is an operational error.

As also shown in FIG. 8, in instances when the supply of flowable solids into the flow passage can vary considerably, for example when the supply of material is dependent upon the operation of a conveyor or other material handling equipment such as the elevator 112, an auxiliary sensor 117 may be provided upstream from the flow passage 14 to measure the flow rate of the material being conveyed to the flow passage 14. When the auxiliary sensor 117 is disposed in a solids supply line supplying the bulk material to the flow passage 14 as shown, the auxiliary sensor 117 can measure volumetric or mass flow rate of the equipment, or measure a value that is representative of the flow rate such as a rotation rate of an auger in the instance of an auger conveyor. The data signal from the auxiliary sensor 117 that is representative of flow rate into the flow passage 14, is communicated to the controller 26 to assist the controller 26 in controlling operation of the actuator 22 to maintain flow within the flow passage within the threshold range of heights as determined by the load cells or within the threshold range of speeds as determined by the speed sensor, to maintain a consolidated flow within the flow passage. The controller 26 is thus further configured to receive flow data from the auxiliary sensor 117 about flow characteristics of the bulk material flowing through the passage, and operate the actuator 22 at least in part based on information contained in the flow data. For instance, if the flow within the conveyor 112 suddenly increases or suddenly decreases, the controller can pre-emptively generate corrective signals to the actuator 22 to begin decreasing or increasing restriction to the flow past the obturating device 20 to ensure that the flow through the flow passage remains within the desired thresholds.

Figure 9:
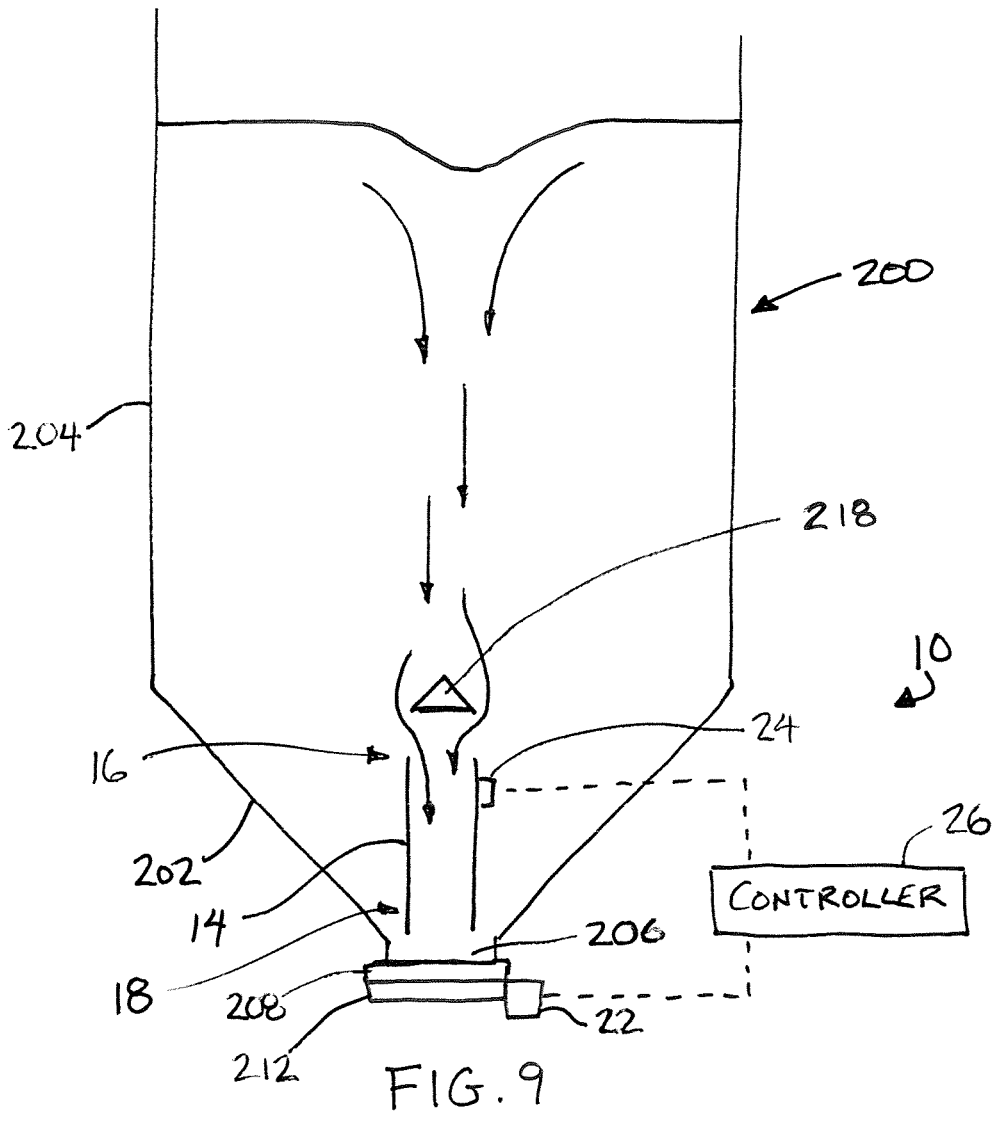
FIG. 9 is a schematic diagram illustrating an embodiment of a bulk material flow measuring and metering apparatus when used inside a bulk material storage vessel.
Figure 10:
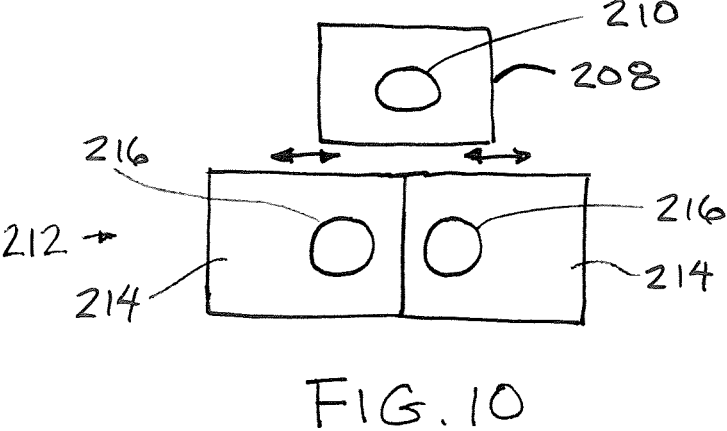
FIG. 10 is a schematic diagram of an obturating device for use with the bulk material storage vessel of FIG. 9.

In further embodiments, for example as schematically represented in FIGS. 9 and 10, the apparatus 10 can be operated inside a bulk storage vessel or container as opposed to under the container, eliminating the need for any apparatus needed under the container. When adapted to operate on a conventional hopper bottom grain storage bin with a slide gate operating over the hopper bottom discharge opening, the factory slide gate could continue to operate as it is intended or to work in conjunction with other valve systems.

The consolidated flow defined herein is based on the principle of the bulk flow of solids like grain, seeds, and fertilizers to flow inside a measuring chamber of a known size with smooth parallel sides, for all the smaller solids to all move in a consolidated block to appear like an image of one larger solid moving past a window and be measured with a camera, or in some other way to measure the speed of the combined consolidated mass. This principle is taking advantage of the way that most common mostly uniform bulk solids naturally move in common circumstances. This principle is sometimes called funnel effect or rat hole effect. It can be described as solids flowing in a basically downward direction directly to the outlet. If the bottom of the container is flat or not too steep of angle on the hopper bottom the material on the sides of the container remain stagnant and the column moves down through the bulk material and empties the container from the top first.

This principle of solid flow can also be created by having an opening or somehow a discharge or movement of the granular product from an exit that can be mostly below or under the smooth walled parallel sided tube 14 for example. This exit or discharge can be located directly under the measuring chamber or even a distance to one side, away from the center of the measuring chamber. This maximum offset distance will vary with different products and their physical characteristics, but all that changes is that there is slightly more stagnant or non-moving granular product in the opposite side of the measuring chamber or area under the measuring chamber. To accommodate this larger amount of stagnant non-moving product, the measuring chamber must be slight longer than if it was directly under the center of the measuring chamber.

Under ideal conditions the height of the measuring chamber and the location of the movement sensor could be as low as 1-1.5 times the diameter of the measuring chamber from the closure 20, but if the discharge location is off to the side this height of the chamber and the height of the speed sensor from the closure 20 might need to be 1.5-2.5 times the diameter of the measuring chamber.

The flow passage 14 or the measuring chamber can be located inside the bulk material storage container, provided that it is mostly directly above the discharge. In many cases the discharge does not need any kind of specific valve. Although a restrictor plate with a maximum size orifice that is smaller than the size of the measuring chamber is preferred to be installed in addition to a gate or valve structure, the conventional slide gate of a container upon which the apparatus is installed can still be used; however, a multiple closure slide gate or valve that closes from 2 or more sides and opens from the center directly below the middle of the measuring chamber would be ideal, and would minimize needed distance of the sensor from the closure 2 and reduce the chance of inaccurate measurements so that the controller does not function correctly.

The function of the apparatus 10 generally takes advantage of the natural principles of how grain or many bulk solids flow, the features of their friction and interaction with other particles, and to flow with the force of gravity. The measuring chamber or flow passage 14 is preferably located inside the container with enough clearance between the bottom end of the flow passage and a corresponding lower boundary structure of the container or discharge gate, to allow material to fall past the outside of the flow passage if the bottom restrictor plate and/or slide gate is removed.

The measuring system would only function correctly when the container or hopper bin in most cases was at least partially or mostly full. The last portion of the container surrounding the flow passage 14 could not be measured but would be a similar amount every time and under most circumstances would be fairly small. Many large grain storage bins can hold from 2000-6000 bushels of solids. The amount of product that could not be measured would only be maybe 20-50 bushels or so. To fully clean out the hopper bottom, the main slide gate could be closed, allowing the secondary slide gate and/or restrictor plate to be removed, followed by the main slide gate being opened so that the remaining material would empty outside and under the measuring chamber.

If retrofitting an existing hopper storage container, the limited space under the hopper bin is only taken up by the slide gate and can easily be removed by hand, as it might weigh 20-40 lbs. The main original slide gate of the container can still be used as intended. This provides safety and peace of mind while allowing the vast majority of the product to be volumetrically measured. In some instance, the original slide gate or valve system of the container can be directly operated by the controller 26 according to the present invention to discharge the required volume of product at the correct rate. When using an additional flow restrictor and/or slide gate to control discharge from the flow passage, a single modified slide gate and restrictor plate unit could be used on multiple containers or bins by transferring the unit between the different containers while maintaining use of the original slide gates on the containers when the modified unit is not attached.

When the flow passage is located inside the storage container, an additional baffle member, for example a cone shaped top according to the illustrated embodiment, can be used to partially shield the opening to the measuring chamber to keep the downward force of the product consistent no matter how full the bin or container is. This baffle member could be any shape, but cone shaped would make it self-cleaning. This addition would eliminate any potential variation in density of the product caused by changing pressures or forces as the amount of product in the bin changes.

The embodiment of the apparatus 10 shown in FIGS. 9 and 10 will now be described in further detail. In this instance the apparatus 10 is supported internally within a surrounding structure such as a bulk storage vessel 200. The bulk storage vessel 200 defines a lower boundary structure 202 forming the lower boundary of the vessel 200 for receiving and storing the flowable bulk material therein. According to the illustrated embodiment, the vessel 200 is a conventional grain storage bin having a cylindrical side wall 204 extending vertically upward from a hopper bottom defining the lower boundary structure 202. More particularly, the hopper bottom is an inverted cone shape having a conical wall tapering downwardly and inwardly from the cylindrical side wall 204 towards a central bottom discharge opening 206 at the bottom of the vessel through which contents of the vessel can be discharged. In a conventional grain storage bin, a slide gate is mounted horizontally across the bottom discharge opening for closing the discharge opening to retain stored material within the vessel and for opening the discharge opening to discharge contents of the vessel therethrough when desired. This slide gate may remain operational, or be replaced by other suitable valve structures that allow the discharge opening to be opened in varying amounts at various opening sizes.

When mounted inside a vessel, the apparatus 10 again comprises a tube 14 extending between an open top end 16 is an open bottom and 18 similarly to previous embodiments. The bottom end is situated to be spaced slightly above the lower boundary structure 202 formed by the hopper bottom and valve structure across the discharge opening of the hopper bottom. The diameter of the tube is slightly less than the diameter of the existing bottom discharge opening 206 to provide a small annular gap between the tube 14 and the boundary of the discharge opening to allow some of the material in the container to bypass the tube 14 for direct discharge when the metering apparatus 10 is inactive so that the storage vessel 200 can be used in the normal manner to store and discharge material if desired. The bottom end 18 of the tube also remains spaced slightly above the lower boundary structure 202 to provide further clearance for material bypassing around the tube structure 14 if desired when the metering apparatus 10 is inactive.

The apparatus 10 shown in FIGS. 9 and 10 differs from previous embodiments and that there is no closure 20 or other obturating device in direct engagement with the bottom end of the tube 14, but rather the gate at the bottom discharge opening 206 or an additional modified valve structure at the discharge opening is instead used to control the flow through the flow passage of the tube 14 to produce a consolidated column-like flow according to the previous embodiments. The actuator 22 in this instance operates the discharge valve structure under instruction from the controller 26 in response to speed data provided by the speed sensor 24 again in the manner of the previous embodiments.

According to the illustrated embodiment, an additional restrictor plate 208 is mounted across the bottom discharge opening 206 having a restricted opening 210 formed therein which is reduced in diameter compared to the diameter of the bottom discharge opening 206 and may also be equal to or reduced in diameter relative to the diameter of the flow passage so that even when the valve structure of the vessel is fully opened, flow through the restricted opening of the restrictor plate 208 concentrates the flow discharged from the vessel 200 through the flow passage which is in alignment above the restricted opening 210. The restricted opening 210 is preferably located within the lateral boundaries of the flow passage above but may be offset to one side and still operate effectively as described above.

Operating together with the restrictor plate 208 is a modified slide gate 212 comprised of one or more panels which are horizontally slidable relative to the discharge opening 206 to open and close the discharge opening. According to the exploded view of FIG. 10, the modified slide gate 212 operating immediately below the restrictor plate 208 comprises two slide panels 214 each locating a respective gate opening 216 therein. The slide panels 214 are intended to be displaced laterally across the bottom discharge opening from diametrically opposing sides so that the discharge opening is defined by the overlap between the two gate openings 216. When the gate openings 216 are fully aligned, the discharge opening 206 is fully open for maximum discharge. When the gate openings 216 do not overlap, the gate is fully closed and each gate opening is closed by the opposing panel to prevent discharge of material therethrough. When the gate openings partially overlap by varying amounts, the effective discharge opening will accordingly vary in size to vary the discharge rate. The actuator 22 operates to simultaneously displace the two panels 214 towards and away from one another.

As the lower boundary structure is much larger in diameter than the bottom end of the flow passage and the bottom end is located sufficiently close to the lower boundary, the piling of the flowable solids discharged from the bottom end of the flow passage into a pile on the lower boundary structure at a natural angle of repose of the flowable solids will result in the pile effectively closing the bottom end of the flow passage through the tube 14. That is the bottom end of the tube 14 is situated inside or below the upper boundary of the piled material that is piled on the bottom end of the container at its natural angle of repose.

When the apparatus 10 is mounted inside a bulk storage vessel 200, an additional baffle device 218 may be mounted spaced above the top end 16 of the tube 14 to carry some of the weight of the bulk material stored in the vessel above the tube 14. In the illustrated embodiment, the baffle device is a conical structure sloping downwardly and outwardly from a central apex to prevent material from being trapped on the top side of the baffle device during cleanout. The diameter of the baffle device is shown to be near the diameter of the flow passage but could be slightly greater or slightly less than the diameter of the flow passage.

In each instance, when the discharge opening 206 of the vessel 200 is opened, a flow of material is discharged below the bottom end of the tube 14 to cause the material in the tube to flow downwardly towards the discharge opening. The controller 26 adjusts the discharge rate by controlling the actuator 22 to ensure that the material flows through the flow passage of the tube 14 in a consolidated flow as described above. Similarly to the discharge of a conventional hopper bottom vessel, the material stored in the vessel 200 will tend to discharge in a central columnar flow immediately above the discharge opening. In the presence of the baffle device 218, the central column like flow discharging from the vessel 200 merely flows around the baffle device 218 so that the baffle device carries some of the weight of the material above without fully restricting the flow into the flow passage. The speed sensor 24 operates in the usual manner to collect the data which is used by the controller 26 to determine volumetric flow when the cross-sectional area of the flow passages known, and/or the mass flow rate when the density of the material is also known.

Deployment or use of apparatus 100 is not limited to the illustrative examples discussed above and one or more apparatuses can be used in many different applications with many different types of equipment wherein knowing the flow rate of bulk material and the density of the bulk material is desired. As a non-limiting example, apparatus 100 could be used many different locations, such as under augers, in the flow path of flowable solids, in harvesting and processing machines, where measuring the volumetric flow of the flowable bulk material is desired and/or periodic density measurements are desired.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A volumetric flow measuring and metering apparatus for flowable solids, the apparatus comprising:
   a flow passage that is generally arranged in an upright orientation and has opposite open top and bottom ends through which a flow of bulk material may be passed;
   a speed sensor disposed to measure a speed of the bulk material flowing through the passage and output a data signal having information about a speed of the bulk material flow;
   an obturating device operatively located relative to the bottom end of the flow passage;
   an actuator operably connected to the obturating device and operable to selectively position the obturating device relative to the bottom end of the flow passage so as to controllably vary discharge from the bottom end of the flow passage; and
   a controller operatively connected to the speed sensor and the actuator;
   wherein the controller is configured to (i) receive speed data from the speed sensor about the speed of the bulk material flowing through the passage and (ii) operate the actuator at least in part based on information contained in the speed data in a manner causing the bulk material to flow in the flow passage at a location of the speed sensor in a consolidated column-like flow.

2. The volumetric flow measuring and metering apparatus of claim 1, wherein the controller operates the actuator to maintain the speed of the bulk material within a prescribed threshold range, the prescribed threshold range being determined to cause the bulk material to flow in the flow passage in said consolidated column-like flow.

3. The volumetric flow measuring and metering apparatus according to claim 1, wherein the obturating device is movable in a linear direction toward and away from the bottom end of the flow passage.

4. The volumetric flow measuring and metering apparatus according to claim 1, wherein the flow passage has a circular cross-sectional area.

5. The volumetric flow measuring and metering apparatus according to claim 1, wherein the obturating device is conically or frusto-conically shaped and its apex is positioned along a central axis of the flow passage.

6. The volumetric flow measuring and metering apparatus according to claim 1, further comprising:
   a vibrator operably connected to the flow passage and being operatable to impart a vibrational force in the bulk material flowing through the flow passage.

7. The volumetric flow measuring and metering apparatus according to claim 1, wherein the speed sensor is an optical sensor.

8. The volumetric flow measuring and metering apparatus according to claim 1, wherein the flow passage is defined within a tube, the apparatus further comprising:

a chute having a chute flow passage with open opposite ends;

one or more electrical load cells;

the one more electrical load cells connecting the tube to the chute such that the tube is suspended in the chute, and the load cells being operable to measure the weight of the tube; and wherein the one more electrical load cells are operatively connected to the controller.

9. The volumetric flow measuring and metering apparatus according to claim 1, wherein a cross-sectional shape of the flow passage is constant along a portion of length of the passage at and immediately above the speed sensor.

10. The volumetric flow measuring and metering apparatus according to claim 1, wherein the flow passage is defined in a tube, the apparatus further comprising:

an outer structure receiving the tube therein;

one or more electrical load cells connecting the tube to the outer structure such that the tube is suspended in the outer structure, the load cells being operable to measure the weight of the tube;

wherein the controller is further configured to (i) receive weight data from the one or more electrical load cells about the weight of the tube, and (ii) operate the actuator at least in part based on information contained in the weight data in a manner causing the bulk material to flow in the flow passage in a consolidated column-like flow.

11. The volumetric flow measuring and metering apparatus according to claim 1, wherein the flow passage is defined in a tube and wherein the tube is mounted inside a bulk material storage vessel.

12. The volumetric flow measuring and metering apparatus according to claim 11, wherein the bulk material storage vessel includes a bottom discharge for discharging contents of the bulk material storage vessel therethrough and wherein the obturating device is operable to open and close the bottom discharge of the bulk material storage vessel.

13. The volumetric flow measuring and metering apparatus according to claim 11, further comprising a baffle device supported in operative relation to open top end of the flow passage about which bulk material must flow to enter the flow passage.

14. The volumetric flow measuring and metering apparatus according to claim 1, wherein the obturating device is operative relative to a discharge opening in a lower boundary structure and wherein the bottom end of the flow passage is spaced above the lower boundary structure such that bulk material piled on the lower boundary structure in a closed position of the obturating device closes the bottom end of the flow passage.

15. The volumetric flow measuring and metering apparatus according to claim 1, wherein a height of the speed sensor relative to the obturating device is equal to or greater than a diameter of the flow passage.

16. The volumetric flow measuring and metering apparatus according to claim 1, in combination with an agricultural implement comprising a delivery system for delivering the solids to the ground as the implement is towed across the ground, wherein:

the metering apparatus is arranged for metering the solids into the delivery system at a prescribed volumetric rate;

the controller is arranged to operate the actuator at least in part based on information contained in the speed data in a manner causing the bulk material to flow in the flow passage at the prescribed volumetric rate; and wherein the flow passage is sized to cause the bulk material to flow in the flow passage in said consolidated column-like flow at the prescribed volumetric flow rate.

17. A volumetric flow measuring and metering apparatus for flowable solids, the apparatus comprising:

a tube defining a flow passage that is generally arranged in an upright orientation and has opposite open top and bottom ends through which a flow of bulk material may be passed;

an outer structure receiving the tube therein;

one or more electrical load cells connecting the tube to the outer structure such that the tube is suspended in the outer structure, the load cells being operable to measure the weight of the tube;

an obturating device operatively located relative to the bottom end of the flow passage;

an actuator operably connected to the obturating device and operable to selectively position the obturating device relative to the bottom end of the flow passage so as to controllably vary discharge from the bottom end of the flow passage; and a speed sensor disposed to measure a speed of the bulk material flowing through the passage and output a data signal having information about a speed of the bulk material flow; and a controller operatively connected to the speed sensor, the one or more electrical load cells and the actuator;

wherein the controller is configured to (i) receive speed data from the speed sensor about the speed of the bulk material flowing through the passage, (ii) receive weight data from the one or more electrical load cells about the weight of the tube, and (iii) operate the actuator at least in part based on information contained in either one or both of the weight data and the speed data in a manner causing the bulk material to flow in the flow passage in a consolidated column-like flow.

18. An agricultural implement for delivering a flowable solid onto the ground, the implement comprising:

a delivery system for delivering the solids to the ground as the implement is towed across the ground;

a metering apparatus for metering the solids into the delivery system at a prescribed flow rate, the metering apparatus comprising:

a flow passage that is generally arranged in an upright orientation and has opposite open top and bottom ends through which a flow of bulk material may be passed;

a speed sensor disposed to measure a speed of the bulk material flowing through the passage and output a data signal having information about a speed of the bulk material flow;

an obturating device operatively located relative to the bottom end of the flow passage;

an actuator operably connected to the obturating device and operable to selectively position the obturating device relative to the bottom end of the flow passage so as to controllably vary discharge from the bottom end of the flow passage; and a controller operatively connected to the actuator, the controller being configured to (i) receive speed data from the speed sensor about the speed of the bulk material flowing through the passage and (ii) operate the actuator at least in part based on information contained in the speed data in a manner causing the bulk material to flow in the flow passage at the prescribed flow rate;

wherein the flow passage is sized to cause the bulk material to flow in the flow passage at a location of the speed sensor in a consolidated column-like flow at the prescribed flow rate.

19. The implement according to claim 18, wherein the controller is further configured to compare the speed data to at least one alert criterium indicative of a blockage or a lack of solids in the flow passage, and (ii) determine an alert condition if the speed data meets said at least one alert criterium.

20. The implement according to claim 18, further comprising at least one auxiliary sensor disposed in a solids supply line supplying the bulk material to said flow passage to measure a flow characteristic of solids flowing in the solids supply line, the controller being further configured to (i) receive flow data from the at least one auxiliary sensor about flow characteristics of the bulk material flowing through the passage and (ii) operate the actuator at least in part based on information contained in the flow data.

* * * * *